(12) United States Patent
Patankar et al.

(10) Patent No.: US 10,389,834 B2
(45) Date of Patent: Aug. 20, 2019

(54) AUTOMATED COLLABORATIVE ENVIRONMENT SITE VIEWER SYSTEM

(71) Applicant: Syntel, Inc., Troy, MI (US)

(72) Inventors: Dheeraj Anil Patankar, Maharashtra (IN); Moreshwar Marne, Maharashtra (IN)

(73) Assignee: Syntel, Inc., Troy, MI (US)

(*) Notice: Subject to any disclaimer, the term of this patent is extended or adjusted under 35 U.S.C. 154(b) by 0 days.

(21) Appl. No.: 14/054,348

(22) Filed: Oct. 15, 2013

(65) Prior Publication Data

US 2015/0106452 A1    Apr. 16, 2015

(51) Int. Cl.
*H04L 29/06* (2006.01)
*H04L 29/08* (2006.01)

(52) U.S. Cl.
CPC .......... *H04L 67/2804* (2013.01); *H04L 63/10* (2013.01); *H04L 63/102* (2013.01)

(58) Field of Classification Search
CPC ............. H04L 41/0253; H04L 63/0815; H04L 63/10–105; G06F 21/41; G06F 21/6218; G06F 2221/2141
See application file for complete search history.

(56) References Cited

U.S. PATENT DOCUMENTS

| | | | |
|---|---|---|---|
| 6,950,983 B1* | 9/2005 | Snavely | G06F 17/243 707/E17.107 |
| 6,976,210 B1* | 12/2005 | Silva | G06F 16/9577 715/205 |
| 7,844,693 B2 | 11/2010 | Bachiri et al. | |
| 8,086,635 B1* | 12/2011 | Rinker | G06F 21/604 707/783 |
| 8,474,048 B2 | 6/2013 | Masood | |
| 2006/0129942 A1* | 6/2006 | McCary | G06Q 10/10 715/741 |
| 2007/0174331 A1* | 7/2007 | Wolf | G06Q 10/00 |
| 2007/0271517 A1* | 11/2007 | Finkelman | G06F 16/951 715/742 |
| 2009/0037406 A1* | 2/2009 | Blackwell | G06Q 30/02 |
| 2009/0044150 A1* | 2/2009 | Liu | G06F 3/0483 715/854 |
| 2009/0313628 A1* | 12/2009 | Zhu | G06F 9/4843 718/101 |
| 2011/0035323 A1* | 2/2011 | Hamilton | G06Q 10/06 705/301 |
| 2011/0209210 A1* | 8/2011 | Miller | G06F 21/41 726/8 |
| 2011/0239132 A1* | 9/2011 | Jorasch | G06F 21/604 715/752 |

(Continued)

*Primary Examiner* — Jeong S Park
(74) *Attorney, Agent, or Firm* — Miles & Stockbridge, P.C.; Eric G. King

(57) ABSTRACT

A system, method, and computer program product for automatically browsing a collaborative environment site. The system may include a selection module on a computer, a browser module on a computer, and a report module on a computer. The selection module may be configured to allow selection of a collaboration site to be viewed. The browser module may be configured to browse the selected collaborative environment site, and retrieve metadata associated with one or more collaborative site classes within the collaborative environment site. The report module may be configured to generate a report displaying the retrieved metadata.

19 Claims, 4 Drawing Sheets

(56) References Cited

U.S. PATENT DOCUMENTS

2012/0060125 A1* 3/2012 Jackson, Jr. ...... G06F 17/30572
  715/853
2012/0198056 A1 8/2012 Shama et al.
2013/0110854 A1* 5/2013 Lockhart ............... G06F 17/212
  707/756
2013/0339838 A1* 12/2013 Ananda ................... G06F 16/93
  715/227
2014/0189804 A1* 7/2014 Lehmann ............... H04L 63/105
  726/4

* cited by examiner

| User/Group | Type | User Name | Permission |
|---|---|---|---|
| Site: LotusMigration Feature Deactivated (http://lab3:7777) | | | |
| Viewers | SharePoint Group | Viewers | ,View Only |
| LotusMigration Owners | SharePoint Group | LotusMigration Owners | ,Full Control |
| ----LAB3\Administrator | | | |
| LotusMigration Visitors | SharePoint Group | LotusMigration Visitors | ,Read |
| ----LAB3\developer1 | | | |
| LotusMigration Members | SharePoint Group | LotusMigration Members | ,Contribute |
| ----LAB3\Administrator | | | |
| ----LAB3\developer1 | | | |
| Style Resource Readers | SharePoint Group | Style Resource Readers | Limited Access |
| ----LAB3\Administrator | | | |
| ----NT AUTHORITY\Authenticated Users | | | |
| Designers | SharePoint Group | Designers | ,Design |
| ----LAB3\Administrator | | | |
| Hierarchy Managers | SharePoint Group | Hierarchy Managers | ,Manage Hierarchy |
| ----LAB3\Administrator | | | |
| Approvers | SharePoint Group | Approvers | ,Approve |
| ----LAB3\Administrator | | | |
| Restricted Readers | SharePoint Group | Restricted Readers | ,Restricted Read |
| ----LAB3\Administrator | | | |
| System Account | User | System Account | Limited Access |
| Site: BI Center (http://lab3:7777/BI Center) | | | |

AUTOMATED COLLABORATIVE ENVIRONMENT SITE VIEWER SYSTEM

TECHNICAL FIELD

This disclosure relates generally to computerized systems, and, in particular, this disclosure relates to a computerized system that is programmed to automatically view a collaborative environment site.

BACKGROUND

Collaborative technology is a fairly recent development in computing. One such collaborative technology is Microsoft SharePoint™ offered by Microsoft Corporation of Redmond, Wash. Companies are migrating to this product because of its capabilities in creating collaboration, integration and an enterprise portal as per the business need. In Sharepoint™, the functionality is enabled through the use of site collections. A site collection includes one or more sites, which further encompass sub-sites.

A site administrator is typically responsible for maintenance of these site collections. As part of this maintenance, the site administrator may set permissions, create security groups, add and delete lists, libraries and sub sites. However, maintenance becomes particularly difficult for sites with deep hierarchies because the site administrator necessarily has to manually browse through each site and sub-site for user permissions and other specifics.

Therefore, there is a need for a tool that automatically browses and retrieves site collection information.

SUMMARY

According to one aspect, the disclosure provides systems, methods, and computer program products for automatically viewing a collaborative environment site. The system may include a selection module on a computer, a browser module on a computer, and a report module on a computer. The selection module may be configured to allow selection of a collaboration site to be viewed. The browser module may be configured to automatically browse the selected collaborative environment site, and retrieve metadata associated with that site. The report module may be configured to generate a report displaying the retrieved metadata. The browser module may further be configured to enumerate through each sub-site within the selected collaborative environment site.

According to another aspect, the disclosure provides computerized system for automatically viewing a collaborative environment site. The system includes memory for storing instructions and data associated with a collaborative environment viewing tool. A processor is configured to execute the stored instructions. The instructions may cause the processor to perform the steps including: allowing selection of the collaborative environment site; browsing the selected collaboration site; retrieving metadata associated with one or more collaborative site classes within the selected collaborative environment site; and generating a report displaying the retrieved metadata.

Additional features and advantages of the will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF THE DRAWINGS

The present disclosure will be described hereafter with reference to the attached drawings which are given as non-limiting examples only, in which:

FIG. 4 is an example screenshot of a generated report according to one embodiment of the disclosure.

Figure 1:
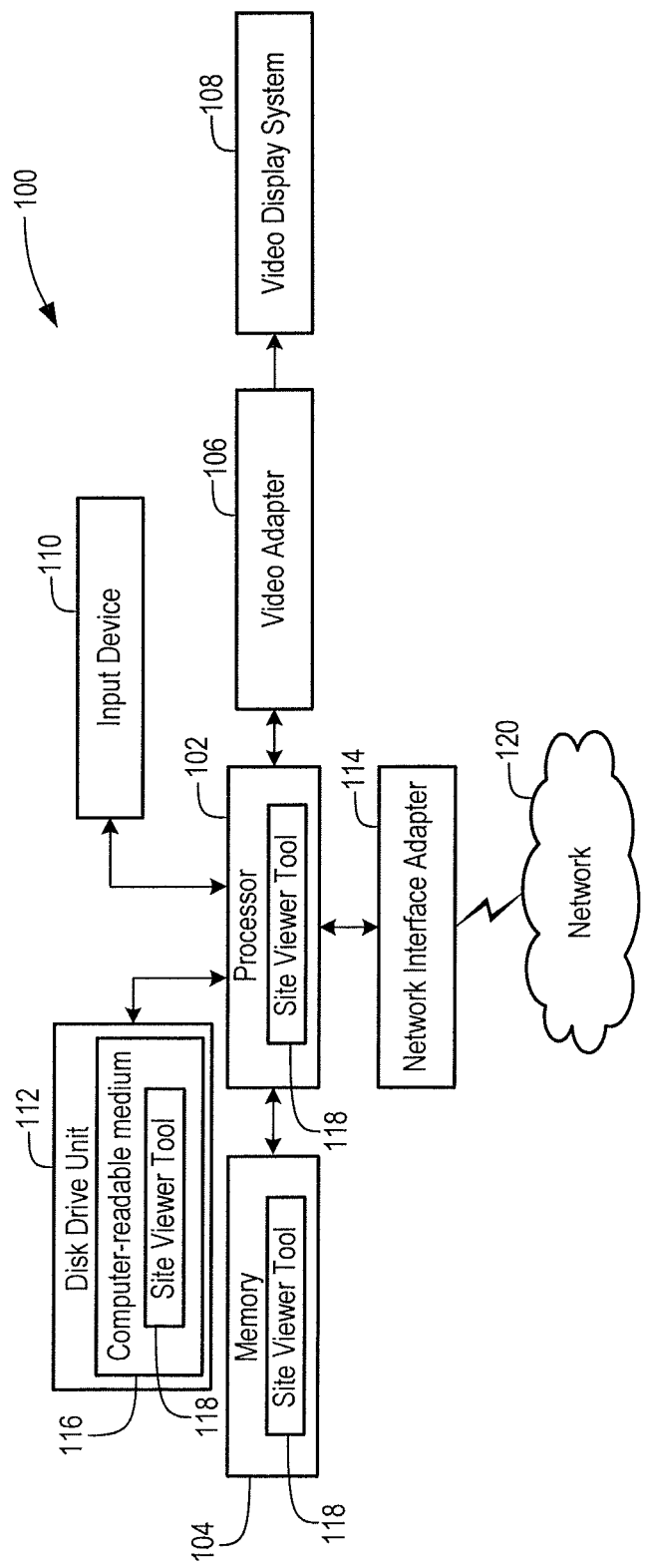
FIG. 1 is a diagrammatical view of an example computing device that may be included in the system and that may be programmed to carry out various methods taught herein according to one embodiment of the disclosure.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Embodiments of the disclosure are directed to a computerized system programmed with a site viewer tool that is configured to automatically browse through a collaborative environment site collection tree down to the leaf node and provide necessary details for each site/sub-site which can then be utilized by site administrators for maintenance purposes. A collaborative environment site may refer to a Sharepoint™ site as offered by Microsoft Corporation of Redmond, Wash. This tool may be helpful for normal site users as well, because they can check their permission levels, site hierarchy, and the like.

FIG. 1 illustrates a diagrammatic representation of a machine 100, in the example form of a computer system, that may be programmed with a set of instructions to perform any one or more of the methods discussed herein. The machine may be a personal computer, a notebook computer, a server, a tablet computer, a personal digital assistant ("PDA"), a cellular telephone, or any machine capable of executing a set of instructions (sequential or otherwise) that specify actions to be taken by that machine.

The machine 100 may operate as a standalone device or may be connected (e.g., networked) to other machines. In embodiments where the machine is a standalone device, the set of instructions could be a computer program stored locally on the device that, when executed, causes the device to perform one or more of the methods discussed herein. Consider an example in which the machine 100 is a tablet device, such as an iPad™ or Android™ device; the computer program could be an "app" installed on the tablet device. In embodiments where the computer program is locally stored, data may be retrieved from local storage or from a remote location via a network. In a networked deployment, the machine 100 may operate in the capacity of a server or a client machine in server-client network environment, or as a peer machine in a peer-to-peer (or distributed) network environment. Although only a single machine is illustrated in FIG. 1, the term "machine" shall also be taken to include any collection of machines that individually or jointly execute a set (or multiple sets) of instructions to perform any one or more of the methods discussed herein.

The example machine 100 illustrated in FIG. 1 includes a processor 102 (e.g., a central processing unit ("CPU")), a memory 104, a video adapter 106 that drives a video display system 108 (e.g., a liquid crystal display ("LCD") or a cathode ray tube ("CRT")), an input device 110 (e.g., a keyboard, mouse, touch screen display, etc.) for the user to interact with the program, a disk drive unit 112, and a network interface adapter 114. Note that various embodiments of the machine 100 will not always include all of these peripheral devices.

The disk drive unit 112 includes a computer-readable medium 116 on which is stored one or more sets of computer instructions and data structures embodying or utilized by a site viewer tool 118 described herein. The computer instructions and data structures may also reside, completely or at least partially, within the memory 104 and/or within the processor 102 during execution thereof by the machine 100; accordingly, the memory 104 and the processor 102 also constitute computer-readable media. Embodiments are contemplated in which the site viewer tool 118 may be transmitted or received over a network 120 via the network interface device 114 utilizing any one of a number of transfer protocols including but not limited to the hypertext transfer protocol ("HTTP") and file transfer protocol ("FTP").

The network 120 may be any type of communication scheme including but not limited to fiber optic, cellular, wired, and/or wireless communication capability in any of a plurality of protocols, such as TCP/IP, Ethernet, WAP, IEEE 802.11, or any other protocol.

While the computer-readable medium 116 shown in the example embodiment of FIG. 1 is a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing a set of instructions for execution by the machine and that cause the machine to perform any one or more of the methods described herein, or that is capable of storing data structures utilized by or associated with such a set of instructions. The term "computer-readable medium" shall accordingly be taken to include, but not be limited to, solid-state memories, optical media, flash memory, and magnetic media.

Figure 2:
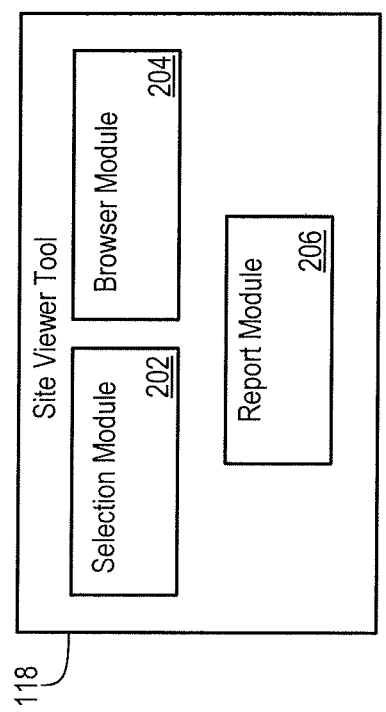
FIG. 2 is a high level diagrammatical view of the system according to one embodiment of the disclosure.

FIG. 2 is an example system architecture that may be used for the auditing tool 100. In the example shown, the site viewer tool 118 includes a selection module 202, a browser module 204, and a report module 206. For the purposes of this specification, the term "module" includes an identifiable portion of computer code, computational or executable instructions, data, or computational object to achieve a particular function, operation, processing, or procedure. A module may be implemented in software, hardware/circuitry, or a combination of software and hardware. An identified module of executable code, for example, may comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code could be a single instruction, or many instructions, and may even be distributed over several different code segments, among different programs, and across several memory devices. Similarly, modules representing data may be embodied in any suitable form and organized within any suitable type of data structure. The data may be collected as a single data set, or may be distributed over different locations including over different storage devices.

According to embodiments of the disclosure, the selection module 202 may allow a user to enter, or select, a site in a collaborative environment to view certain information about that site. The browser module 204 may browse the collection tree of the selected site and retrieve detailed information (for example, from each sub-site) of the selected site. For example, the browser module 204 may use the server object model to retrieve information from a server (e.g., a Sharepoint™ server). The object model may employ the use of various classes, including but not limited to:

| Class Name | Description |
| --- | --- |
| SPSite | Represents a collection of site. |
| SPWeb | Represents a SharePoint site. |
| SPRoleAssignment | Defines role assignment for a user group. |
| SPGroup | Represents a group of users of SharePoint Web. |
| SPRoleDefinition | Defines role definition including name, description, management properties, etc. |
| SPUser | Represents a user in SharePoint site. |

It should be noted that this list of classes is not exhaustive. For example, the tool, in conjunction with the server object model, may employ the use of other classes as well.

The report module 206 may use the retrieved information, and generate a report displaying the results of the search through the site collection that was performed by the browser module 204.

For example, whenever a user inputs a URL (it could be root site collection or a sub-site), the tool traverses through its hierarchy down the line like root site collection-Site-Subsite, etc till the leaf site. It accesses metadata at each level and then produces the same to the end user. This may be done using the SharePoint server object model. The tool then consolidates the metadata and presents it to the user in a readable form as a report, which may be generated using a server side web application framework, such as ASP.NET™ grid, also offered by Microsoft Corporation of Redmond, Wash. The report may be useful for a variety of users, one of whom may be an administrator, who may wish to delete an unused site. According to embodiments of the disclosure, he can simply run the tool, view the generated report, check a site's "last used" column, for example, and make a decision as to its deletion.

For example, if the tool is compiling a list of user names of a site within the subject site collection, the tool may retrieve metadata associated with users of the site, using, in particular, the SPUser class. In a similar fashion, if the tool is compiling a list of user groups using a particular site, the tool may retrieve metadata associated with user groups of the site, using, in particular, the SPGroup class.

The tool may be particularly effective for a site administrator, as he or she is typically tasked with many if not all of the following duties:

Managing and checking the overall server health and functionality
Managing user permissions
Analyzing and reporting upon site usage and activity
Supporting network load balancing needs and ensuring its correct operation
Regularly analyzing site content Accordingly, a site administrator may need to monitor the permissions of users of a site collection. Instead of having to individually view each site of the site collection of interest and then searching for information of each user of that site, the site administrator may efficiently be presented with user permission information through use of the site viewer tool.

For example, by entering a URL of the site collection of interest, the site administrator may be presented with a report including permission information associated with each user of the site collection. With this information, the site administrator can quickly identify specific user permissions.

Figure 3:
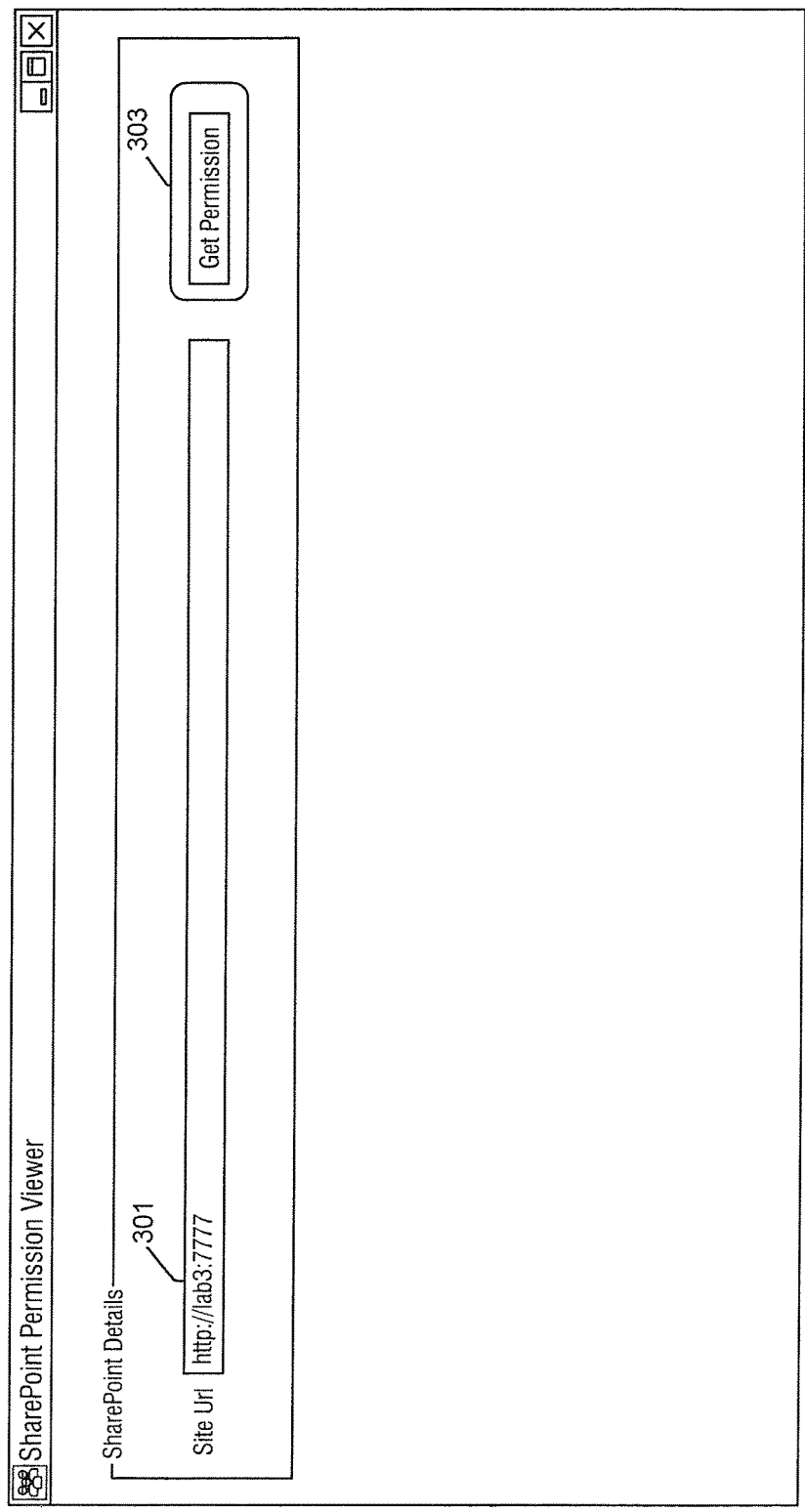
FIG. 3 is an example screenshot of a home page of the system according to one embodiment of the disclosure.

Upon installation of the site viewer tool, a user (e.g., a site administrator) may be presented with a main page, an example of which is shown in the screen shot in FIG. 3. As shown, the user may enter a uniform resource locator ("URL") of a site he or she wishes to monitor (e.g., view details) in Site URL field 301. Upon clicking on a Get Permission button 303, the site viewer tool may proceed to browse through the desired site.

FIG. 4 is an example report displaying details of the browsed site. The report may take many forms. For example, as shown, the report could be generated in hypertext markup language (html). However, other formats may be contemplated. As shown, the report may display information such as the searched site/sub-site 401, users/groups accessing the site 403, the type of the respective user/group accessing the site 405, the user/group name 407, and any permissions of the respective user 409. It should be noted that this list of details is not exhaustive. In light of this disclosure, one of ordinary skill in the art would contemplate other detailed information may be retrieved and reported according to other embodiments. For example, the report may also display information such as when the site was created, when the site was last used, and the like.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed:

1. A computerized system for automatically viewing a collaborative environment site, the system comprising:
   a computer including a processor and a memory;
   a selection module stored on the memory of the computer and, when executed by the processor, configured to allow selection of the collaborative environment site;
   a browser module stored on the memory of the computer and, when executed by the processor, configured to:
      automatically browse at least one collection tree of the selected collaborative environment site for metadata associated with one or more collaborative environment site user classes, wherein the automatic browsing comprises enumerating through each sub-site of the selected collaborative environment site down to every leaf node associated with the selected collaborative environment site and accessing permission metadata associated with one or more collaborative environment site user classes at each sub-site of the selected collaborative environment site via a server object model;
      automatically retrieve metadata associated with the one or more collaborative environment site user classes within the selected collaborative environment site;
      automatically provide the metadata to a user; and
      automatically consolidate the metadata; and
   a report module stored on the memory of the computer and, when executed by the processor, configured to automatically generate a report displaying the retrieved and consolidated metadata.

2. The computerized system of claim 1, wherein the collaborative environment site is a Sharepoint site.

3. The computerized system of claim 1, wherein the report includes group information associated with a group of users accessing the selected collaborative environment site.

4. The computerized system of claim 1, wherein selection of the collaborative environment site includes entering a URL of the collaborative environment site.

5. The computerized system of claim 1, wherein the automatic browsing further comprises accessing timestamp metadata associated with usage of every leaf node associated with the selected collaborative environment site via the server object model.

6. The computerized system of claim 5, wherein the automatic browsing further comprises accessing metadata associated with a list of user names associated with every leaf node associated with the selected collaborative environment site via the server object model.

7. A computerized system for automatically viewing a collaborative environment site, the system comprising:
   one or more computing devices including:
      a memory having program code stored therein;
      a processor in communication with the memory configured to carry out instructions in accordance with the stored program code, wherein the program code, when executed by the processor, causes the processor to perform operations comprising:
         allowing selection of the collaborative environment site;
         automatically browsing at least one collection tree of the selected collaborative environment site for metadata associated with one or more classes of a server object model, wherein the automatic browsing comprises enumerating through each sub-site of the selected collaborative environment site down to every leaf node associated with the selected collaborative environment site and accessing permission metadata associated with one or more collaborative environment site user classes at each sub-site of the selected collaborative environment site via the server object model;
         automatically retrieving metadata associated with the one or more classes of a server object model of the selected collaborative environment site;
         automatically providing the metadata to a user;
         automatically consolidating the metadata; and
         automatically generating a report displaying the retrieved and consolidated metadata.

8. The computerized system of claim 7, wherein the report includes permission level information associated with the user of the selected collaborative environment site.

9. The computerized system of claim 7, further comprising retrieving metadata associated with a user of the selected collaborative environment site by accessing a class associated with users of the selected collaborative environment site.

10. The computerized system of claim 7, wherein the report includes user information associated with a user of the selected collaborative environment site.

11. The computerized system of claim 7, wherein the report includes group information associated with a group of users of the selected collaborative environment site.

12. The computerized system of claim 7, wherein the one or more classes includes a first class representing a collection of sites, a second class defining role assignments for user groups, a third class representing a group of users, and a fourth class defining role definitions.

13. The computerized system of claim 7, wherein the automatic browsing further comprises accessing timestamp metadata associated with usage of every leaf node associated with the selected collaborative environment site via the server object model.

14. The computerized system of claim 13, wherein the automatic browsing further comprises accessing metadata associated with a list of user names associated with every leaf node associated with the selected collaborative environment site via the server object model.

15. A method of automatically viewing a collaborative environment site, the method comprising:
   selecting, via a selection module on a computer, the collaborative environment site;
   automatically browsing, via a browser module on a computer, at least one collection tree of the selected collaborative environment site for metadata associated with a user of the selected collaborative environment site, wherein the automatic browsing comprises enumerating through each sub-site of the selected collaborative environment site down to every leaf node associated with the selected collaborative environment site and accessing permission metadata associated with one or more collaborative environment site user classes at each sub-site of the selected collaborative environment site via a server object model;
   automatically retrieving, via the browser module, the metadata associated with the user of the selected collaborative environment site by accessing a class associated with users of the selected collaborative environment site;
   automatically providing the metadata to a user;
   automatically consolidating the metadata; and
   automatically generating, via a report module on a computer, a report displaying the retrieved and consolidated metadata.

16. The method of claim 15, wherein the retrieved metadata includes a last used column; and comprising deleting at least one of the collaborative environment site and a sub-site of the collaborative environment site according to the last used column.

17. The method of claim 15, wherein the report includes names of users accessing the selected collaborative environment site.

18. The method of claim 15, wherein the automatic browsing further comprises accessing timestamp metadata associated with usage of every leaf node associated with the selected collaborative environment site via the server object model.

19. The method of claim 18, wherein the automatic browsing further comprises accessing metadata associated with a list of user names associated with every leaf node associated with the selected collaborative environment site via the server object model.

* * * * *